(12) United States Patent
Chakraborty et al.

(10) Patent No.: US 11,509,364 B2
(45) Date of Patent: Nov. 22, 2022

(54) TECHNIQUES AND APPARATUSES FOR UPLINK PRECODER DETERMINATION USING DOWNLINK REFERENCE SIGNALS OR DOWNLINK PRECODER DETERMINATION USING UPLINK REFERENCE SIGNALS

(71) Applicant: QUALCOMM Incorporated, San Diego, CA (US)

(72) Inventors: Kaushik Chakraborty, San Diego, CA (US); Tao Luo, San Diego, CA (US); Sony Akkarakaran, Poway, CA (US); Makesh Pravin John Wilson, San Diego, CA (US); Xiao feng Wang, San Diego, CA (US); Shengbo Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 95 days.

(21) Appl. No.: 15/845,585

(22) Filed: Dec. 18, 2017

(65) Prior Publication Data

US 2018/0262242 A1 Sep. 13, 2018

Related U.S. Application Data

(60) Provisional application No. 62/470,629, filed on Mar. 13, 2017.

(51) Int. Cl.
*H04W 4/00* (2018.01)
*H04B 7/0456* (2017.01)
(Continued)

(52) U.S. Cl.
CPC ......... *H04B 7/0456* (2013.01); *H04B 7/0452* (2013.01); *H04B 7/063* (2013.01);
(Continued)

(58) Field of Classification Search
CPC .......... H04W 72/042; H04W 72/0446; H04W 76/27; H04W 24/10; H04L 5/0055;
(Continued)

(56) References Cited

U.S. PATENT DOCUMENTS 9,236,916 B2 1/2016 Wernersson et al.
9,414,379 B2 8/2016 Zhu et al.
(Continued)

FOREIGN PATENT DOCUMENTS

| CN | 102932114 A | 2/2013 |
|---|---|---|
| CN | 105103463 A | 11/2015 |
| WO | 2017007377 A1 | 1/2017 |

OTHER PUBLICATIONS

International Search Report and Written Opinion—PCT/US2018/018218—ISA/EPO—dated Sep. 24, 2018.
(Continued)

*Primary Examiner* — Atique Ahmed
(74) *Attorney, Agent, or Firm* — Harrity & Harrity, LLP

(57) ABSTRACT

Certain aspects of the present disclosure generally relate to wireless communication. In some aspects, a user equipment (UE) may receive an indication of whether to use uplink reference signals or downlink reference signals for uplink precoder determination. The UE may selectively transmit a plurality of uplink reference signals or one or more measurement reports based at least in part on the indication, wherein the one or more measurement reports are determined based at least in part on measuring a plurality of downlink reference signals. The UE may receive an indication of a precoder, of a plurality of precoders, to be used to precode an uplink communication, wherein the precoder is identified based at least in part on the plurality of uplink reference signals or the one or more measurement reports.

(Continued)

The UE may precode the uplink communication using the precoder. Numerous other aspects are provided.

30 Claims, 13 Drawing Sheets

(51) Int. Cl.
*H04W 72/04* (2009.01)
*H04W 24/10* (2009.01)
*H04L 5/00* (2006.01)
*H04B 7/06* (2006.01)
*H04B 7/0452* (2017.01)
*H04L 5/14* (2006.01)
*H04L 5/16* (2006.01)

(52) U.S. Cl.
CPC ......... *H04B 7/0639* (2013.01); *H04B 7/0665* (2013.01); *H04B 7/0695* (2013.01); *H04L 5/005* (2013.01); *H04L 5/0048* (2013.01); *H04W 24/10* (2013.01); *H04W 72/042* (2013.01); *H04L 5/1469* (2013.01); *H04L 5/16* (2013.01)

(58) Field of Classification Search
CPC ... H04L 5/0053; H04L 1/1812; H04L 5/0048; H04L 5/005; H04L 5/16; H04B 7/0456; H04B 7/0452; H04B 7/063; H04B 7/0639; H04B 7/0665; H04B 7/0695; H04B 5/1469
See application file for complete search history.

(56) References Cited

U.S. PATENT DOCUMENTS

| | | | | |
|---|---|---|---|---|
| 9,591,543 | B2 | 3/2017 | Reial et al. | |
| 2011/0317748 | A1* | 12/2011 | Li | H04L 5/005 375/219 |
| 2013/0028134 | A1* | 1/2013 | Wang | H04L 5/0048 370/254 |
| 2013/0072243 | A1 | 3/2013 | Yu et al. | |
| 2013/0242773 | A1* | 9/2013 | Wernersson | H04B 7/0632 370/252 |
| 2014/0098689 | A1* | 4/2014 | Lee | H04B 7/0639 370/252 |
| 2014/0153427 | A1* | 6/2014 | Seo | H04B 17/309 370/252 |
| 2014/0169321 | A1* | 6/2014 | Imamura | H04L 5/0035 370/329 |
| 2015/0222340 | A1* | 8/2015 | Nagata | H04L 25/0224 375/267 |
| 2015/0318908 | A1 | 11/2015 | Ko et al. | |
| 2015/0326286 | A1 | 11/2015 | Wong et al. | |
| 2016/0066340 | A1 | 3/2016 | Zhang et al. | |
| 2016/0072565 | A1* | 3/2016 | Yu | H04L 1/0027 375/267 |
| 2016/0105882 | A1* | 4/2016 | Park | H04W 72/0406 370/329 |
| 2016/0308647 | A1* | 10/2016 | Kwak | H04L 5/0023 |
| 2017/0126294 | A1* | 5/2017 | Wernersson | H04L 5/0048 |
| 2017/0141823 | A1* | 5/2017 | Fodor | H04W 4/025 |
| 2017/0317866 | A1* | 11/2017 | Stirling-Gallacher | H04L 5/1469 |
| 2018/0006700 | A1* | 1/2018 | Frenne | H04B 7/0626 |
| 2018/0242327 | A1* | 8/2018 | Frenne | H04L 25/0204 |
| 2018/0287682 | A1* | 10/2018 | Kwak | H04W 24/10 |
| 2019/0222364 | A1* | 7/2019 | Shimoda | H04L 5/0007 |
| 2020/0076483 | A1* | 3/2020 | Zhang | H04B 7/0456 |
| 2021/0266047 | A1* | 8/2021 | Huang | H04B 7/0639 |

OTHER PUBLICATIONS

VIVO: "Discussion on Beam Management for NR MIMO," 3GPP Draft; R1-1700274_Discussion on Beam Management for NR MIMO, 3rd Generation Partnership Project (3GPP) , Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017, XP051207812, 7 pages, Retrieved from the Internet: URL: http://www.3gpp.org/ftp/Meetings_3GPP_SYNC/RAN1/Docs/[retrieved on Jan. 16, 2017].

ZTE, et al., "QCL/QCB Design for UL MIMO," 3GPP Draft; R1-1701820 QCL QCB Design for UL MIMO, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017, XP051208986, 6 pages, Retrieved from the Internet: URL: http://www.3gpp.org/ftp/Meetings_3GPP_SYNC/RAN1/Docs/ [retrieved on Feb. 12, 2017].

Qualcomm Incorporated: "Non-codebook Based UL Transmission", 3GPP TSG RAN WG1 #88, R1-1702600, Feb. 13-17, 2017, Athens, Greece, pp. 1-4.

Qualcomm Incorporated: "Uplink MIMO Transmission Schemes", 3GPP TSG-RAN WG1 #87, R1-1612047, Nov. 14-18, 2016, Reno, Nevada, USA, pp. 1-4.

\* cited by examiner

TECHNIQUES AND APPARATUSES FOR UPLINK PRECODER DETERMINATION USING DOWNLINK REFERENCE SIGNALS OR DOWNLINK PRECODER DETERMINATION USING UPLINK REFERENCE SIGNALS

CROSS-REFERENCE TO RELATED APPLICATIONS UNDER 35 U.S.C. § 119

This application claims priority to Provisional Application No. 62/470,629, filed on Mar. 13, 2017, entitled "TECHNIQUES AND APPARATUSES FOR UPLINK PRECODER DETERMINATION USING DOWNLINK REFERENCE SIGNALS OR DOWNLINK PRECODER DETERMINATION USING UPLINK REFERENCE SIGNALS," which is hereby expressly incorporated by reference herein.

FIELD OF THE DISCLOSURE

Aspects of the present disclosure generally relate to wireless communication, and more particularly to techniques and apparatuses for uplink precoder determination using downlink reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

Techniques described herein permit a UE and/or a base station to use downlink reference signals (e.g., channel state information reference signals) to determine an uplink precoder and/or to use uplink reference signals (e.g., sounding reference signals) to determine a downlink precoder when there is reciprocity between downlink channels and uplink channels.

In some aspects, a method of wireless communication may be performed by a UE. The method may include receiving an indication of whether to use uplink reference signals or downlink reference signals for uplink precoder determination; selectively transmitting a plurality of uplink reference signals or one or more measurement reports based at least in part on the indication, wherein the one or more measurement reports are determined based at least in part on measuring a plurality of downlink reference signals; receiving an indication of a precoder, of a plurality of precoders, to be used to precode an uplink communication, wherein the precoder is identified based at least in part on the plurality of uplink reference signals or the one or more measurement reports; and precoding the uplink communication using the precoder.

In some aspects, a method of wireless communication may be performed by a base station. The method may include receiving, from a UE, one or more measurement reports associated with a plurality of downlink reference signals, wherein the plurality of downlink reference signals are measured by the UE using a plurality of precoders; identifying a downlink reference signal, of the plurality of downlink reference signals, based at least in part on the one or more measurement reports, wherein the downlink reference signal corresponds to a precoder, of the plurality of precoders, to be used by the UE to precode an uplink communication; and transmitting, to the UE, an indication of at least one of the downlink reference signal or the precoder.

In some aspects, a method of wireless communication may be performed by a base station. The method may include determining a degree of reciprocity between one or more downlink beams and one or more corresponding uplink beams that form reciprocal beam pairs with the one or more downlink beams; selectively identifying a precoder, of a plurality of precoders, to be used to precode the downlink communication based at least in part on the degree of reciprocity, wherein the precoder is identified based at least in part on measuring a plurality of uplink reference signals using the plurality of precoders or receiving one or more measurement reports associated with one or more downlink reference signals; and precoding the downlink communication using the precoder.

In some aspects, a UE for wireless communication may include a memory and one or more processors operatively coupled to the memory. The memory and the one or more processors may be configured to receive an indication of whether to use uplink reference signals or downlink reference signals for uplink precoder determination; selectively transmit a plurality of uplink reference signals or one or more measurement reports based at least in part on the indication, wherein the one or more measurement reports are determined based at least in part on measuring a plurality of downlink reference signals; receive an indication of a precoder, of a plurality of precoders, to be used to precode an uplink communication, wherein the precoder is identified based at least in part on the plurality of uplink reference signals or the one or more measurement reports; and precode the uplink communication using the precoder.

In some aspects, a base station for wireless communication may include a memory and one or more processors operatively coupled to the memory. The memory and the one or more processors may be configured to receive, from a UE, one or more measurement reports associated with a plurality of downlink reference signals, wherein the plurality of downlink reference signals are measured by the UE using a plurality of precoders; identify a downlink reference signal, of the plurality of downlink reference signals, based at least in part on the one or more measurement reports, wherein the downlink reference signal corresponds to a precoder, of the plurality of precoders, to be used by the UE to precode an uplink communication; and transmit, to the UE, an indication of at least one of the downlink reference signal or the precoder.

In some aspects, a base station for wireless communication may include a memory and one or more processors operatively coupled to the memory. The memory and the one or more processors may be configured to determine a degree of reciprocity between one or more downlink beams and one or more corresponding uplink beams that form reciprocal beam pairs with the one or more downlink beams; selectively identify a precoder, of a plurality of precoders, to be used to precode the downlink communication based at least in part on the degree of reciprocity, wherein the precoder is identified based at least in part on measuring a plurality of uplink reference signals using the plurality of precoders or receiving one or more measurement reports associated with one or more downlink reference signals; and precode the downlink communication using the precoder.

In some aspects, an apparatus for wireless communication may include means for receiving an indication of whether to use uplink reference signals or downlink reference signals for uplink precoder determination; means for selectively transmitting a plurality of uplink reference signals or one or more measurement reports based at least in part on the indication, wherein the one or more measurement reports are determined based at least in part on measuring a plurality of downlink reference signals; means for receiving an indication of a precoder, of a plurality of precoders, to be used to precode an uplink communication, wherein the precoder is identified based at least in part on the plurality of uplink reference signals or the one or more measurement reports; and means for precoding the uplink communication using the precoder.

In some aspects, an apparatus for wireless communication may include means for receiving, from a UE, one or more measurement reports associated with a plurality of downlink reference signals, wherein the plurality of downlink reference signals are measured by the UE using a plurality of precoders; means for identifying a downlink reference signal, of the plurality of downlink reference signals, based at least in part on the one or more measurement reports, wherein the downlink reference signal corresponds to a precoder, of the plurality of precoders, to be used by the UE to precode an uplink communication; and means for transmitting, to the UE, an indication of at least one of the downlink reference signal or the precoder.

In some aspects, an apparatus for wireless communication may include means for determining a degree of reciprocity between one or more downlink beams and one or more corresponding uplink beams that form reciprocal beam pairs with the one or more downlink beams; means for selectively identifying a precoder, of a plurality of precoders, to be used to precode the downlink communication based at least in part on the degree of reciprocity, wherein the precoder is identified based at least in part on measuring a plurality of uplink reference signals using the plurality of precoders or receiving one or more measurement reports associated with one or more downlink reference signals; and means for precoding the downlink communication using the precoder.

In some aspects, a non-transitory computer-readable medium may store one or more instructions for wireless communication. The one or more instructions, when executed by one or more processors of a user equipment, may cause the one or more processors to receive an indication of whether to use uplink reference signals or downlink reference signals for uplink precoder determination; selectively transmit a plurality of uplink reference signals or one or more measurement reports based at least in part on the indication, wherein the one or more measurement reports are determined based at least in part on measuring a plurality of downlink reference signals; receive an indication of a precoder, of a plurality of precoders, to be used to precode an uplink communication, wherein the precoder is identified based at least in part on the plurality of uplink reference signals or the one or more measurement reports; and precode the uplink communication using the precoder.

In some aspects, a non-transitory computer-readable medium may store one or more instructions for wireless communication. The one or more instructions, when executed by one or more processors of a base station, may cause the one or more processors to receive, from a UE, one or more measurement reports associated with a plurality of downlink reference signals, wherein the plurality of downlink reference signals are measured by the UE using a plurality of precoders; identify a downlink reference signal, of the plurality of downlink reference signals, based at least in part on the one or more measurement reports, wherein the downlink reference signal corresponds to a precoder, of the plurality of precoders, to be used by the UE to precode an uplink communication; and transmit, to the UE, an indication of at least one of the downlink reference signal or the precoder.

In some aspects, a non-transitory computer-readable medium may store one or more instructions for wireless communication. The one or more instructions, when executed by one or more processors of a base station, may cause the one or more processors to determine a degree of reciprocity between one or more downlink beams and one or more corresponding uplink beams that form reciprocal beam pairs with the one or more downlink beams; selectively identify a precoder, of a plurality of precoders, to be used to precode the downlink communication based at least in part on the degree of reciprocity, wherein the precoder is identified based at least in part on measuring a plurality of uplink reference signals using the plurality of precoders or receiving one or more measurement reports associated with one or more downlink reference signals; and precode the downlink communication using the precoder.

Aspects generally include a method, apparatus, system, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
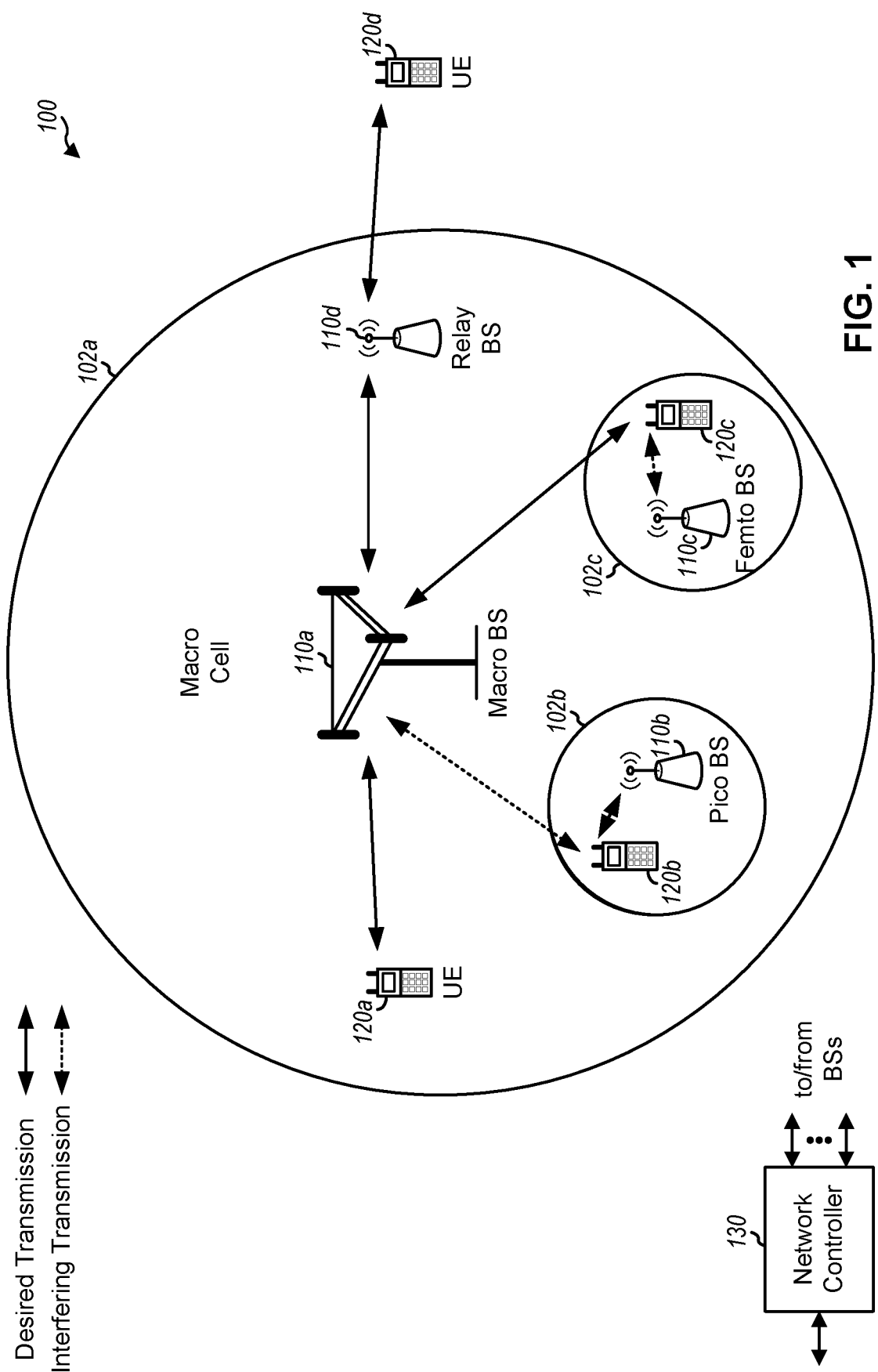
FIG. 1 is a block diagram conceptually illustrating an example of a wireless communication network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
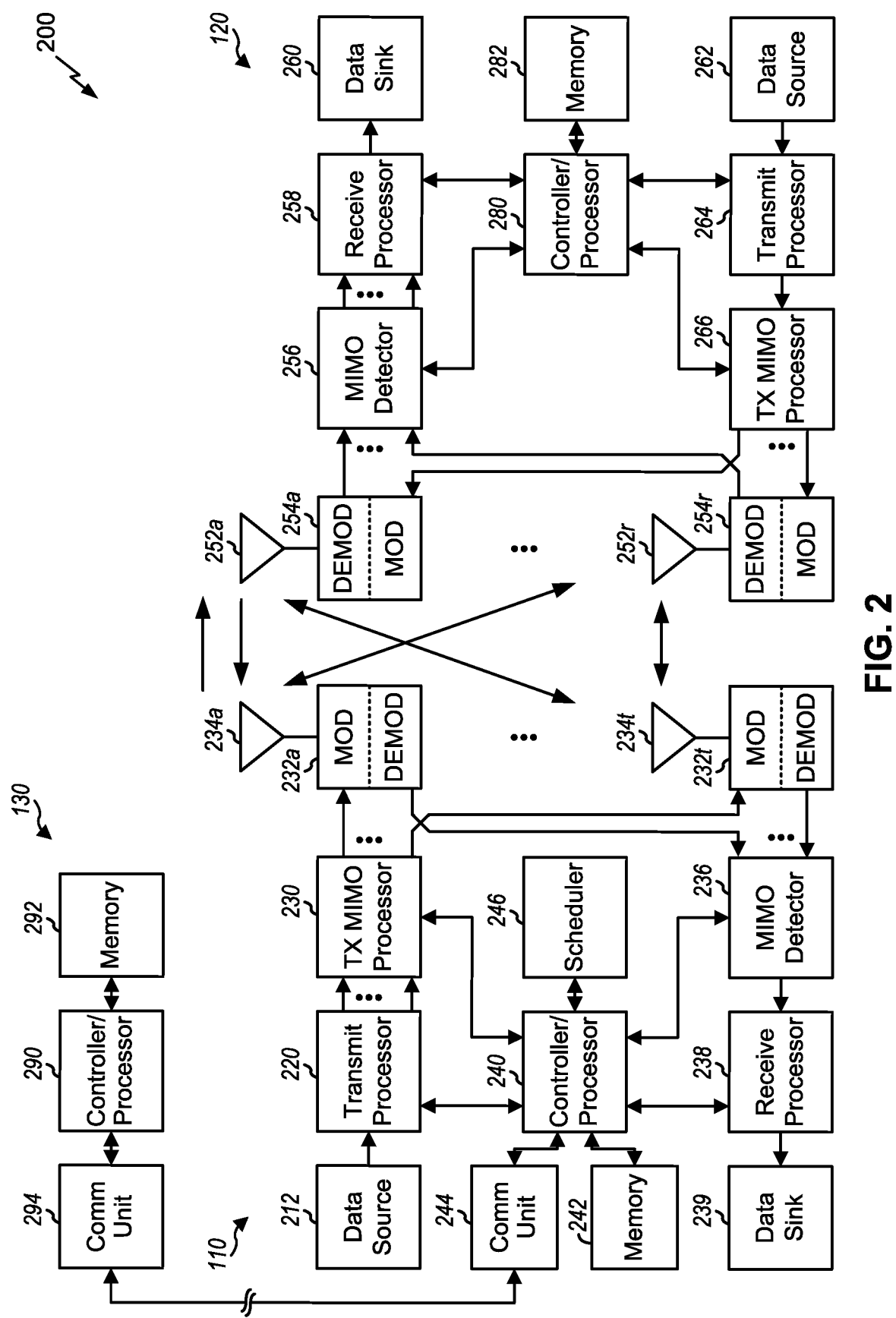
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform uplink precoder determination using downlink reference signals and/or downlink precoder determination using uplink reference signals. For example, controller/processor 280 and/or other processors and modules at UE 120, may perform or direct operations of UE 120 to perform uplink precoder determination using downlink reference signals. For example, controller/processor 280 and/or other controllers/processors and modules at UE 120 may perform or direct operations of, for example, process 1100 of FIG. 11 and/or other processes as described herein. In some aspects, one or more of the components shown in FIG. 2 may be employed to perform example process 1100, example process 1200, example process 1300, and/or other processes for the techniques described herein. Memories 242 and 282 may store data and program codes for base station 110 and UE 120, respectively. A scheduler 246 may schedule UEs for data transmission on the downlink and/or uplink.

In some aspects, the UE 120 may include means for receiving an indication of whether to use uplink reference signals or downlink reference signals for uplink precoder determination; means for selectively transmitting a plurality of uplink reference signals or one or more measurement reports based at least in part on the indication, wherein the one or more measurement reports are determined based at least in part on measuring a plurality of downlink reference signals; means for receiving an indication of a precoder, of a plurality of precoders, to be used to precode an uplink communication, wherein the precoder is identified based at least in part on the plurality of uplink reference signals or the one or more measurement reports; means for precoding the uplink communication using the precoder; and/or the like. Such means may include one or more components of the UE 120 described herein in connection with FIG. 2.

In some aspects, a base station 110 may include means for receiving, from a UE, one or more measurement reports associated with a plurality of downlink reference signals, wherein the plurality of downlink reference signals are measured by the UE using a plurality of precoders; means for identifying a downlink reference signal, of the plurality of downlink reference signals, based at least in part on the one or more measurement reports, wherein the downlink reference signal corresponds to a precoder, of the plurality of precoders, to be used by the UE to precode an uplink communication; means for transmitting, to the UE, an indication of at least one of the downlink reference signal or the precoder; and/or the like. Additionally, or alternatively, the base station 110 may include means for determining a degree of reciprocity between one or more downlink beams and one or more corresponding uplink beams that form reciprocal beam pairs with the one or more downlink beams; means for selectively identifying a precoder, of a plurality of precoders, to be used to precode the downlink communication based at least in part on the degree of reciprocity, wherein the precoder is identified based at least in part on measuring a plurality of uplink reference signals using the plurality of precoders or receiving one or more measurement reports associated with one or more downlink reference signals; means for precoding the downlink communication using the precoder; and/or the like. Such means may include one or more components of the base station 110 described herein in connection with FIG. 2.

As indicated above, FIG. 2 is provided merely as an example. Other examples are possible and may differ from what was described with regard to FIG. 2.

Figure 3:
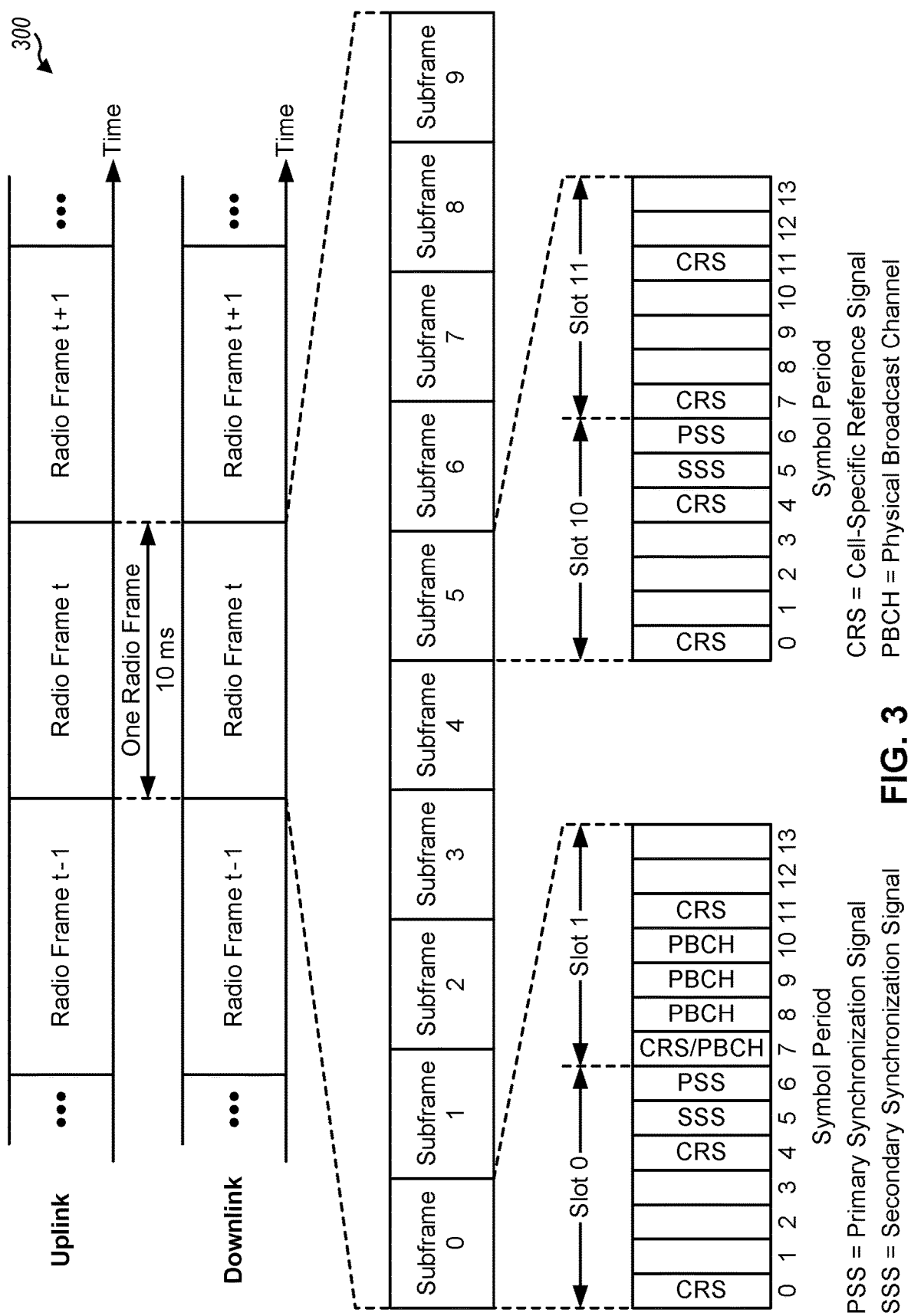
FIG. 3 is a block diagram conceptually illustrating an example of a frame structure in a wireless communication network, in accordance with certain aspects of the present disclosure.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
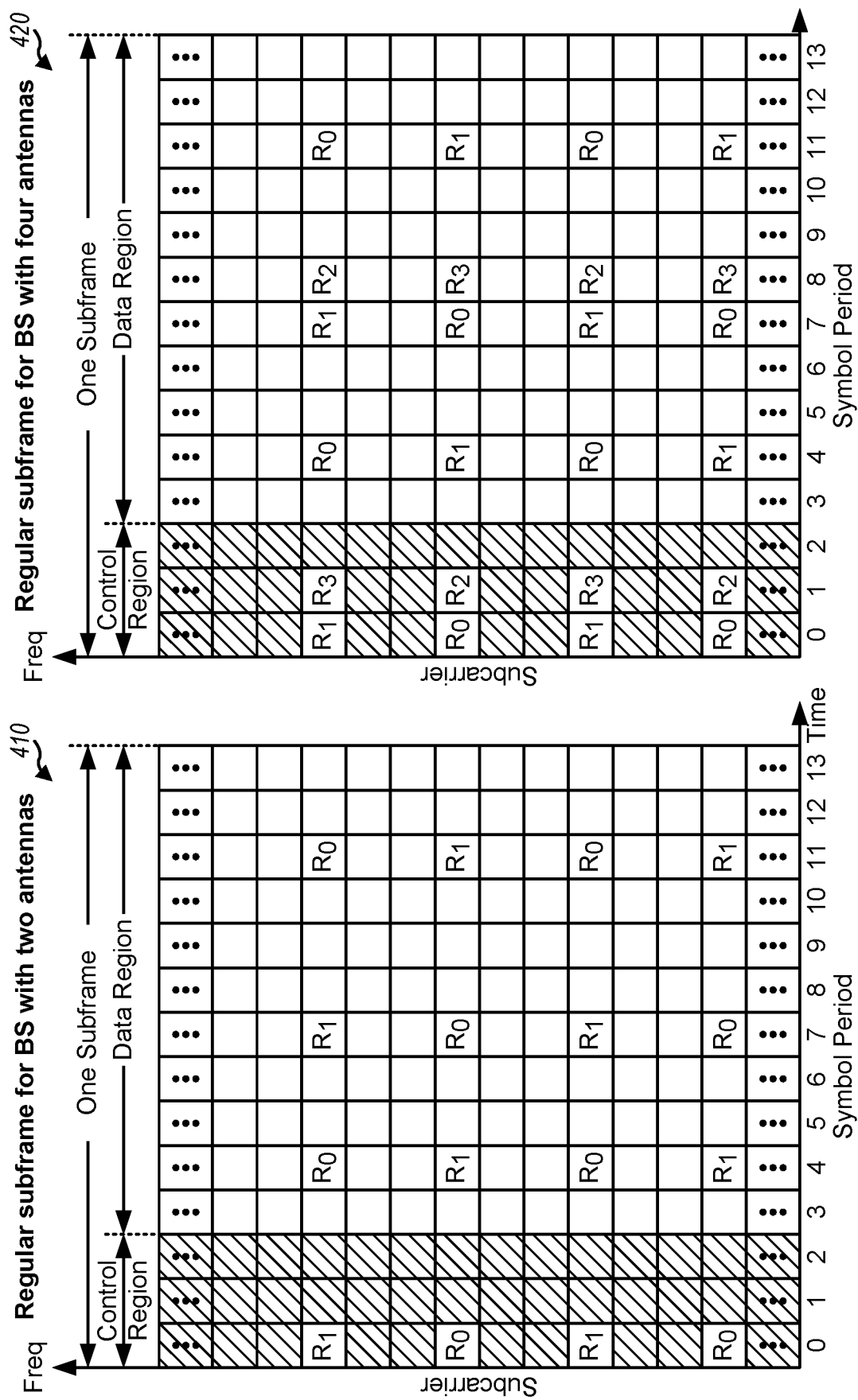
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
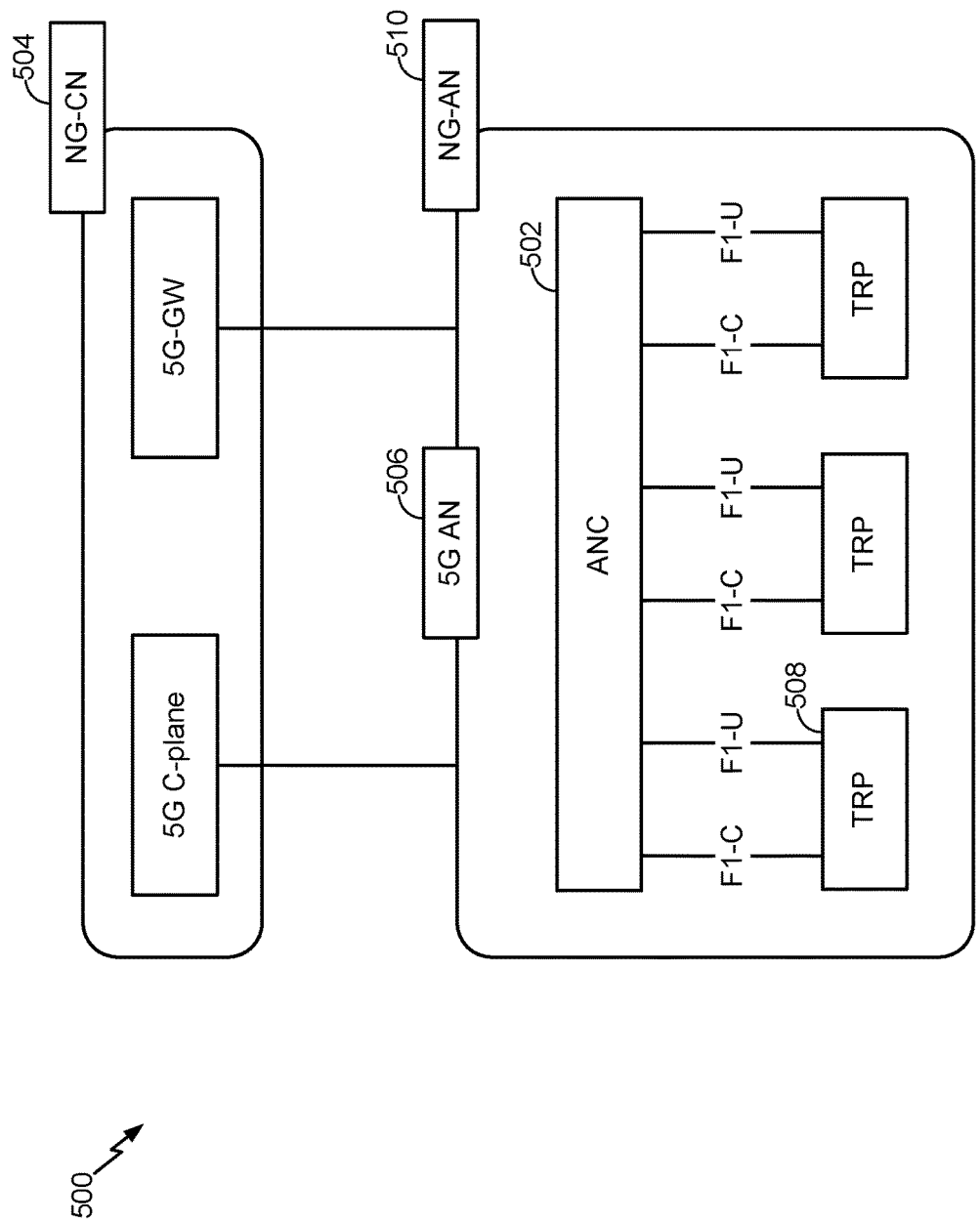
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
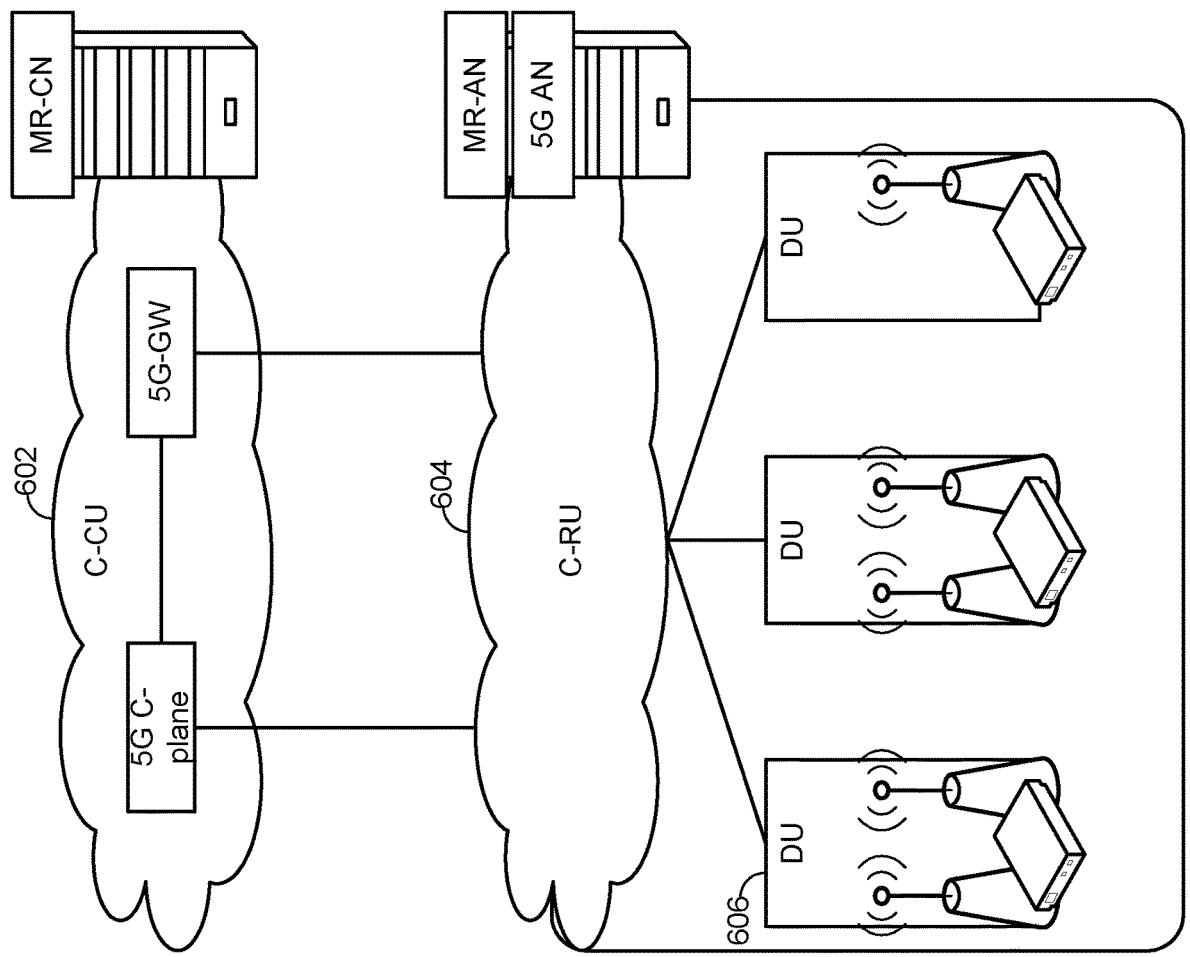
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
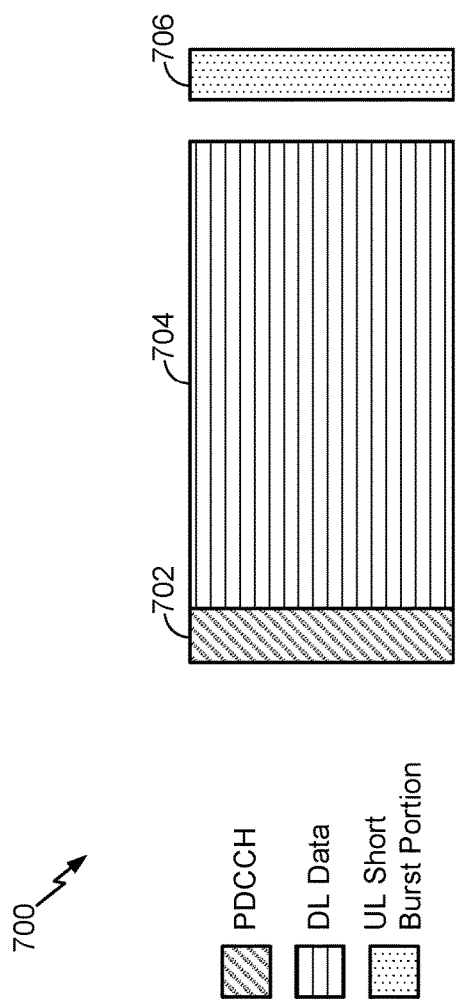
FIG. 7 is a diagram illustrating an example of a downlink (DL)-centric subframe, in accordance with certain aspects of the present disclosure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
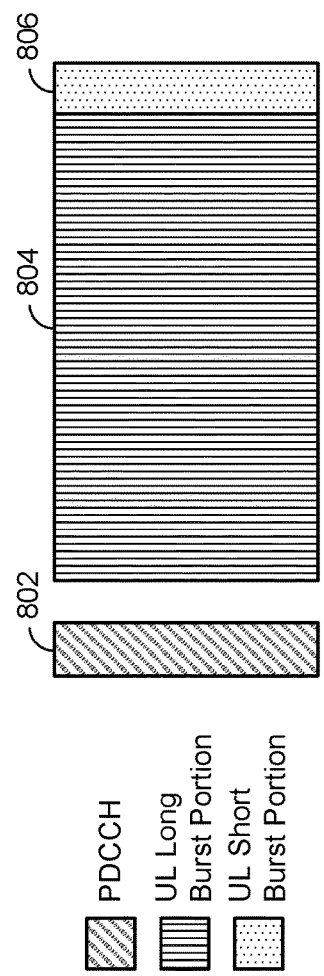
FIG. 8 is a diagram illustrating an example of an uplink (UL)-centric subframe, in accordance with certain aspects of the present disclosure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

In wireless communication, a precoder may be used by a UE and/or a base station to configure one or more multiple input, multiple output (MIMO) layers and/or one or more antenna beams for improved transmission and reception of wireless communications (e.g., for an improved signal-to-noise ratio and/or the like). Different precoders may be used to apply different weights to values associated with one or more antennas, signals, transmission powers, transmission chains, reception chains, and/or the like.

In some cases, a UE may transmit multiple sounding reference signals (SRS) to a base station, and may use different precoders for transmission of different SRS communications. For example, the UE may be instructed by the base station to transmit different SRS communications using a pre-specified sequence of uplink precoders. The base station may identify a preferred communication channel based on receiving the multiple SRS communications (e.g., a channel with a high channel quality or the best channel quality as compared to other channels). The base station may indicate, to the UE, a precoder to be used for uplink transmissions (e.g., for uplink control on the PUCCH, for uplink data on the PUSCH, and/or the like), such as by transmitting information that identifies the precoder or transmitting information that identifies the SRS communication that corresponds to the precoder. The UE may use the precoder indicated by the base station to improve communication quality. However, this technique may consume significant uplink resources because the UE transmits multiple SRS communications.

Techniques described herein permit a UE and/or a base station to use downlink reference signals to determine an uplink precoder and/or to use uplink reference signals to determine a downlink precoder. In some cases, there may be channel quality reciprocity between an uplink channel and a corresponding downlink channel (e.g., channels associated with reciprocal over-the air-characteristics and/or device characteristics, channels for which the UE and base station perform calibration operations to maintain reciprocity between uplink and downlink signal paths, channels that are part of the same reciprocal beam pair, and/or the like). In this case, downlink reference signals, such as channel state information reference signals (CSI-RS), may be used to estimate uplink channel characteristics, which may then be used for determination of a precoder to be used by the UE. Similarly, uplink reference signals may be used to estimate downlink channel characteristics, which may then be used for determination of a precoder to be used by a base station. In this way, network resources may be conserved by reducing the need to transmit additional uplink and/or downlink reference signals.

Figure 9A:
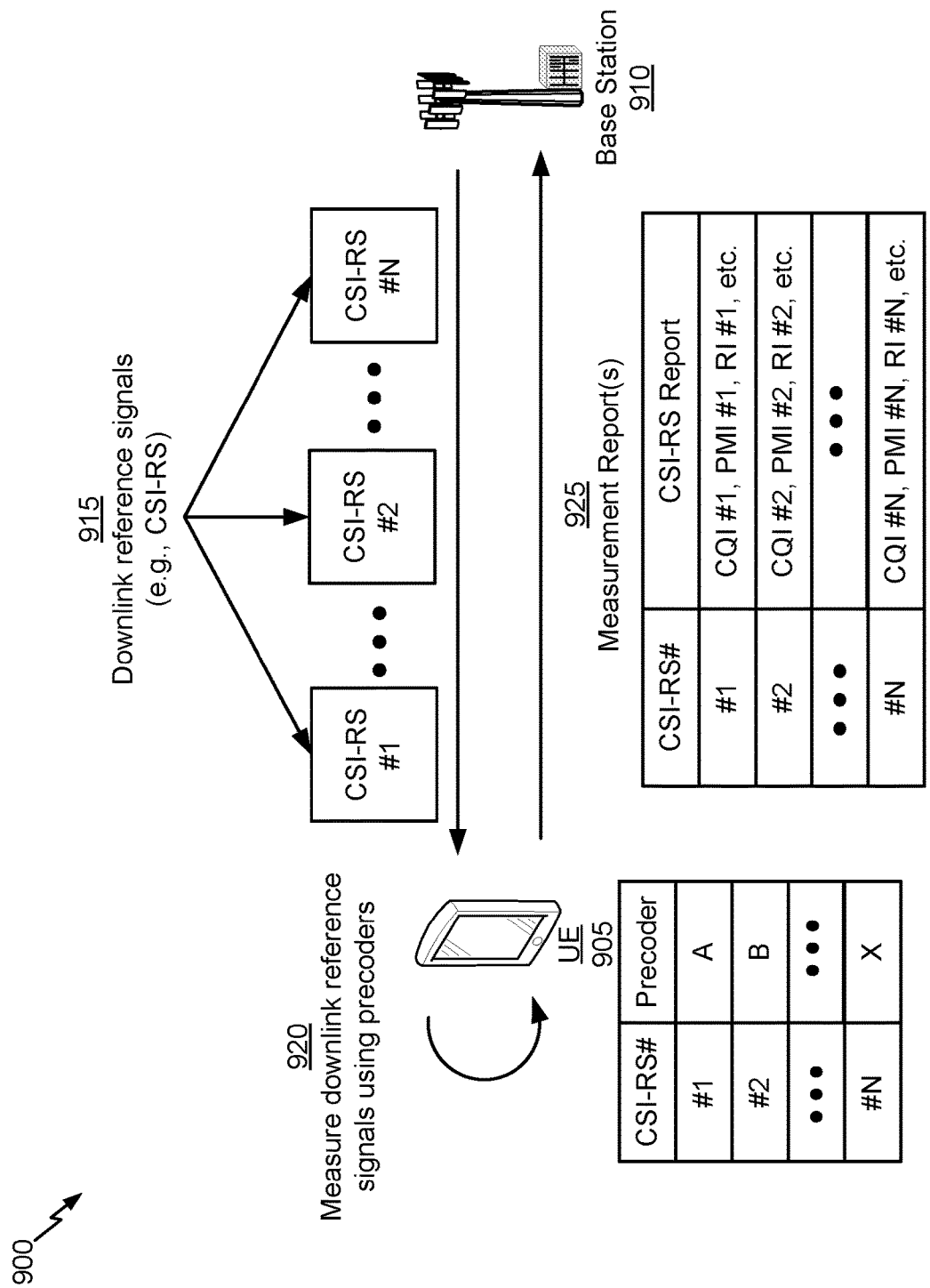
FIGS. 9A and 9B are diagrams illustrating an example of uplink precoder determination using downlink reference signals, in accordance with various aspects of the present disclosure.
Figure 9B:
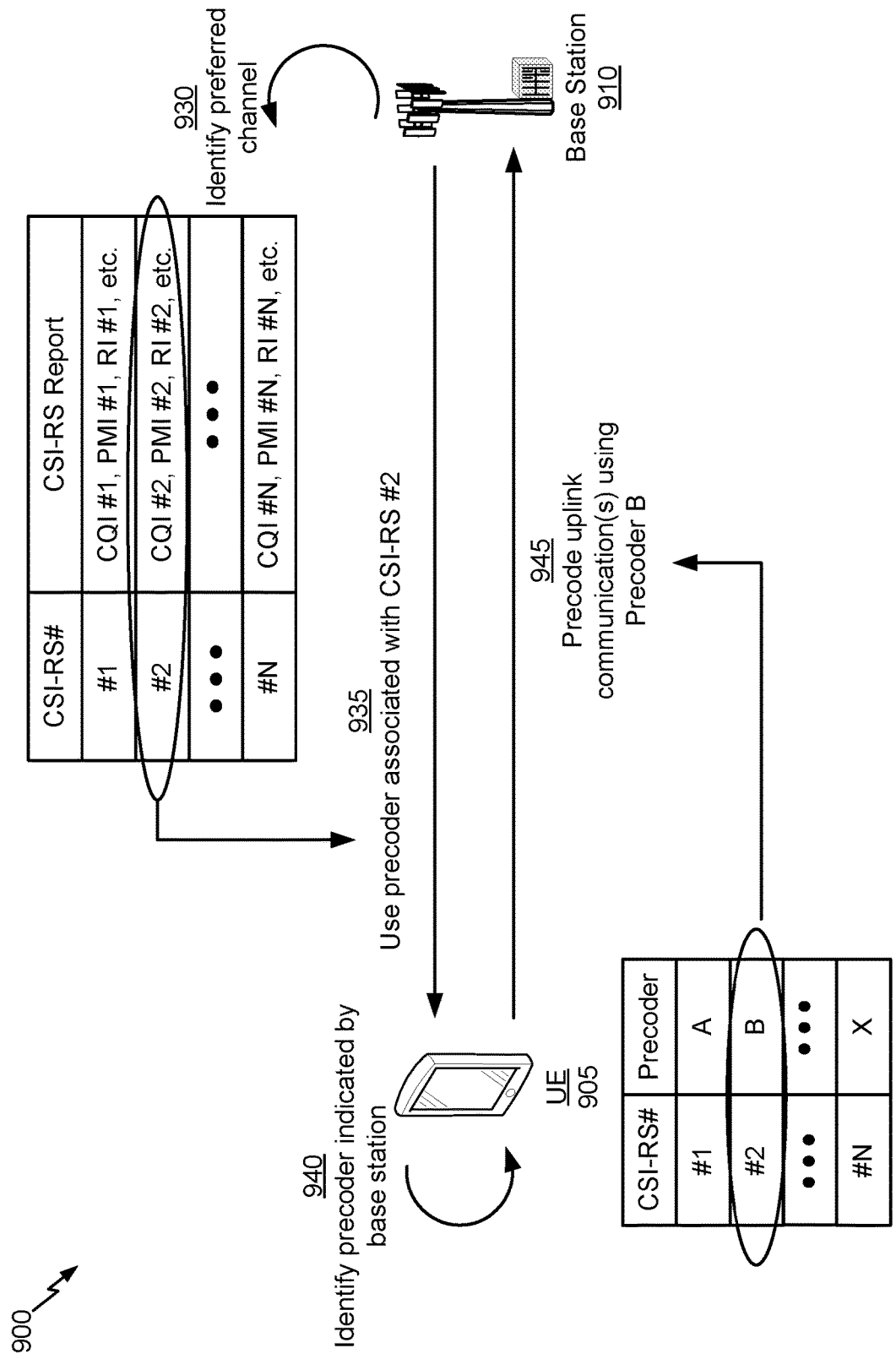

FIGS. 9A and 9B are diagrams illustrating an example 900 of uplink precoder determination using downlink reference signals, in accordance with various aspects of the present disclosure.

As shown in FIG. 9A, a UE 905 may communicate with a base station 910. The UE 905 may correspond to, for example, the UE 120 of FIG. 1 and/or the like. The base station 910 may correspond to, for example, the base station 110 of FIG. 1 and/or the like.

As shown by reference number 915, the base station 910 may transmit a plurality of downlink reference signals to the UE 905. As shown, in some aspects, the plurality of downlink reference signals are a plurality of channel state information reference signals (CSI-RS). A CSI-RS may include, for example, channel quality information (CQI), a precoding matrix indicator (PMI), a precoding type indicator (PTI), a rank indicator (RI), and/or the like. In some aspects, the base station 910 may transmit the downlink reference signals according to a schedule (e.g., a periodic schedule or an aperiodic schedule), and may notify the UE 905 of the schedule (e.g., in radio resource control (RRC) connection configuration information and/or the like). Different CSI-RS communications may be associated with different weights to control values associated with, for example, a beam direction, a precoder assignment, a transmission power, and/or the like. For example, different CSI-RS communications may be transmitted using different precoders.

As shown by reference number 920, the UE 905 may measure the plurality of downlink reference signals using different precoders. For example, the UE 905 may tune to a downlink reference signal, and may measure the downlink reference signal. In some aspects, the UE 905 may cycle through a plurality of precoders to receive the downlink reference signals. As an example, the UE 905 may use a first precoder shown as Precoder A to measure a first downlink reference signal shown as CSI-RS #1, may use a second precoder shown as Precoder B to measure a second downlink reference signal shown as CSI-RS #2, and/or the like.

In some aspects, the precoder cycling may occur according to a pattern. In some aspects, the pattern may be a preconfigured pattern negotiated between the UE 905 and the base station 910 (e.g., during RRC connection configuration). In this case, the base station 910 may store information that indicates a correspondence between a precoder and a downlink reference signal. Alternatively, the base station 910 may not receive and/or store information that indicates such correspondence, in some aspects.

As shown by reference number 925, the UE 905 may transmit, to the base station 910, one or more measurement reports based at least in part on measuring the plurality of downlink reference signals. For example, a CSI-RS measurement report corresponding to CSI-RS #1 may indicate a first CQI value (e.g., CQI #1), a first PMI value (e.g., PMI #1), a first RI value (e.g., RI #1), and/or the like. Similarly, a CSI-RS measurement report corresponding to CSI-RS #2 may indicate a second CQI value (e.g., CQI #2), a second PMI value (e.g., PMI #2), a second RI value (e.g., RI #2), and/or the like.

As shown in FIG. 9B, and by reference number 930, the base station 910 may use the measurement report(s) to identify a preferred communication channel, which may be associated with a precoder. For example, the preferred communication channel may be associated with a better reported channel quality than one or more other measured downlink references signals included in the measurement report(s). In some aspects, the preferred communication channel may be associated with the best reported channel quality as compared to the other measured downlink references signals included in the measurement report(s). As shown, the communication channel associated with CSI-RS #2 may be associated with a better combination of CQI, PMI, and RI values as compared to the communication channels associated with CSI-RS #1, CSI-RS #N, and/or the like.

In some aspects, the base station 910 may further identify the preferred communication channel and/or the precoder based at least in part on one or more scheduling decisions. The base station 910 may make a scheduling decision based at least in part on, for example, one or more uplink reference signals received from the UE 905 (e.g., one or more SRS communications), an indication of an uplink and/or a downlink channel quality, and/or the like.

As shown by reference number 935, the base station 910 may transmit, to the UE 905, an indication of a precoder to be used to precode one or more uplink communications. In some aspects, the indication may include information that identifies the precoder. For example, the base station 910 may store information that indicates a correspondence between a precoder and a downlink reference signal, and may identify the precoder based at least in part on the downlink reference signal associated with the preferred communication channel. Additionally, or alternatively, the indication may include information that identifies the downlink reference signal associated with the preferred communication channel, shown as CSI-RS #2. In this case, the indication may include, for example, an indication of a particular CSI-RS resource in a particular transmission time interval.

In some aspects, the base station 910 may transmit the indication of the precoder in downlink control information (DCI). For example, the DCI may identify the precoder to be used to precode the uplink communication, a downlink reference signal corresponding to the precoder, a ranking of the precoder and at least one other precoder, a ranking of the downlink reference signal and at least one other downlink reference signal, and/or the like. Additionally, or alternatively, the DCI may indicate a first precoder to be used for a first uplink channel (e.g., a PUCCH) and a second precoder to be used for a second uplink channel (e.g., a PUSCH). In some aspects, the first precoder for the first uplink channel and/or the second precoder for the second uplink channel may be explicitly indicated in the DCI. In some aspects, the first precoder and/or the second precoder may be indicated using CSI-RS indices.

As shown by reference number 940, the UE 905 may identify the precoder indicated by the base station 910. In some aspects, the UE 905 may directly identify the precoder if the precoder is identified in the indication from the base station 910. In some aspects, when the indication identifies the downlink reference signal, the UE 905 may identify the precoder based at least in part on a correspondence between the precoder and the downlink reference signal identified in the indication. For example, and as shown, the UE 905 may store information that indicates a correspondence between different precoders used to measure different downlink reference signals. In example 900, the UE 905 receives an indication of CSI-RS #2, and determines that Precoder B was used to measure CSI-RS #2.

In some aspects, the UE 905 may select and use another precoder to precode one or more uplink communications based at least in part on a determination that the precoder indicated by the base station 910 cannot be used. For example, the UE 905 may be unable to use the precoder indicated by the base station 910 due to hand blocking and/or the like. During hand blocking, there may be an asymmetry between uplink and downlink channel quality since the UE 905 can receive signals but will not be able to transmit signals beyond the maximum permissible limit subject to the location of the user's hand in proximity to the UE 905. Such asymmetry may be detectable by the UE 905, but not by the base station 910. In this case, the UE 905 may identify another precoder to use. In some aspects, the base station 910 may transmit a ranking (e.g., a ranked list) of precoders and/or downlink reference signals, and the UE 905 may identify a precoder based at least in part on the ranking (e.g., may first attempt to use a first precoder in the ranked list, then a second precoder in the ranked list, and/or the like).

As shown by reference number 945, the UE 905 may precode one or more uplink communications using the identified precoder, shown as Precoder B, and may transmit the one or more uplink communications to the base station 910. In some aspects, a single indication by the base station 910 may correspond to multiple precoders to be used by the UE 905 for different uplink channels (e.g., a PUSCH, a PUCCH, and/or the like). Additionally, or alternatively, the base station 910 may indicate multiple precoders in the indication, and the multiple precoders may correspond to multiple uplink channels. The UE 905 may precode uplink communication(s) for the multiple channels using corresponding precoders indicated by the base station 910.

In some aspects, the UE 905 may apply a correction factor to precode the uplink communication(s) using the precoder. For example, an uplink channel and a downlink channel may lack true reciprocity, and the UE 905 may account for this by applying a correction factor. The correction factor may include, for example, an adjustment to account for an imbalance between a transmission chain of the UE 905 (e.g., corresponding to the uplink channel) and a reception chain of the UE 905 (e.g., corresponding to the downlink channel). In some aspects, the adjustment may include a modification of one or more weights applied to values associated with one or more antennas, signals, transmission powers, transmission chains, reception chains, and/or the like.

Additionally, or alternatively, the correction factor may account for differences in reciprocity between an uplink channel or beam and a corresponding downlink channel or beam (e.g., where the uplink beam and the downlink beam form a reciprocal beam pair). In some aspects, the UE 905 may modify the correction factor as beam conditions change. The UE 905 may measure one or more beam conditions and/or may receive an indication of the one or more beam conditions from the base station 910.

In some aspects, a degree of reciprocity between an uplink beam and a corresponding downlink beam may change such that the beams have a low degree of reciprocity (e.g., a parameter indicative of reciprocity does not satisfy a threshold). In this case, the base station 910 may transmit an indication, to the UE 905, that the UE 905 is to transmit uplink reference signals (e.g., SRS) to the base station 910, and the base station 910 may use the uplink reference signals to determine an uplink precoder. In this case, the base station 910 may stop transmitting downlink reference signals (e.g., CSI-RS), or may reduce a periodicity of downlink reference signal transmission, thereby conserving network resources.

If the degree of reciprocity is high at a different time (e.g., a parameter indicative of reciprocity satisfies a threshold), then the base station 910 may transmit an indication, to the UE 905, that the UE 905 is to transmit the downlink reference signals in one or more measurement reports, and the base station 910 may use the downlink reference signals to determine an uplink precoder. In some aspects, the indication may indicate the degree of reciprocity between one or more uplink beams (e.g., an uplink beam to be used for an uplink communication) and one or more corresponding downlink beams (e.g., that form reciprocal beam pairs with the one or more uplink beams). In some aspects, the degree of reciprocity of a reciprocal beam pair may be determined based at least in part on comparing uplink reference signals (e.g., SRS) for an uplink beam and downlink reference signals (e.g., CSI-RS) for a corresponding downlink beam.

In some aspects, the indication of the degree of reciprocity and/or whether to use uplink reference signals or downlink reference signals for uplink precoder determination may be transmitted periodically. Additionally, or alternatively, the indication may be transmitted based at least in part on a determination that the degree of reciprocity has crossed a threshold (e.g., satisfies the threshold or no longer satisfies the threshold). Additionally, or alternatively, the indication may be transmitted based at least in part on a determination that the degree of reciprocity has changed by a threshold amount.

By using downlink reference signals to determine an uplink precoder, the UE 905 and the base station 910 may conserve network resources by skipping or preventing transmission of one or more uplink references signals, such as SRS communications, that would otherwise be used by the base station 910 to identify the precoder to be used for the one or more uplink communications. Is some cases, this may result in a longer periodicity of SRS transmissions as compared to a periodicity of CSI-RS transmissions. In some aspects, SRS transmissions in one or more beam directions may be skipped, thereby conserving network and UE resources.

In some aspects, the base station 910 may transmit, to the UE 905, an indication relating to a quantity or a directionality of uplink reference signals (e.g., SRS) to be transmitted by the UE 905. For example, the base station 910 may indicate a quantity that is less than a quantity of uplink reference signals that the UE 905 would otherwise transmit if the uplink reference signals were used to determine an uplink precoder. Additionally, or alternatively, the base station 910 may indicate fewer directions for transmission of uplink reference signals as compared to a quantity of directions in which the UE 905 would otherwise transmit uplink reference signals if the uplink reference signals were used to determine an uplink precoder.

In some aspects, the base station 910 may determine the quantity and/or directionality of the uplink reference signals based at least in part on a determination of a correspondence between one or more downlink reference signals and one or more uplink reference signals with regard to channel quality. For example, if the uplink reference signals and the downlink reference signals are highly correlated, then this may indicate that the uplink and downlink channels are highly reciprocal, and fewer uplink reference signals would be needed to accurately identify a preferred communication channel and/or uplink precoder using downlink reference signals. Conversely, if the uplink reference signals and the downlink reference signals are not highly correlated, then this may indicate that the uplink and downlink channels share less reciprocity, and more uplink reference signals would be needed to accurately identify a preferred communication channel and/or uplink precoder using downlink reference signals. Thus, the UE 905 and the base station 910 can conserve uplink resources by adjusting a quantity of uplink reference signals to be transmitted by the UE 905 when an uplink precoder can be identified using downlink reference signals.

As indicated above, FIGS. 9A and 9B are provided as an example. Other examples are possible and may differ from what was described with respect to FIGS. 9A and 9B.

Figure 10:
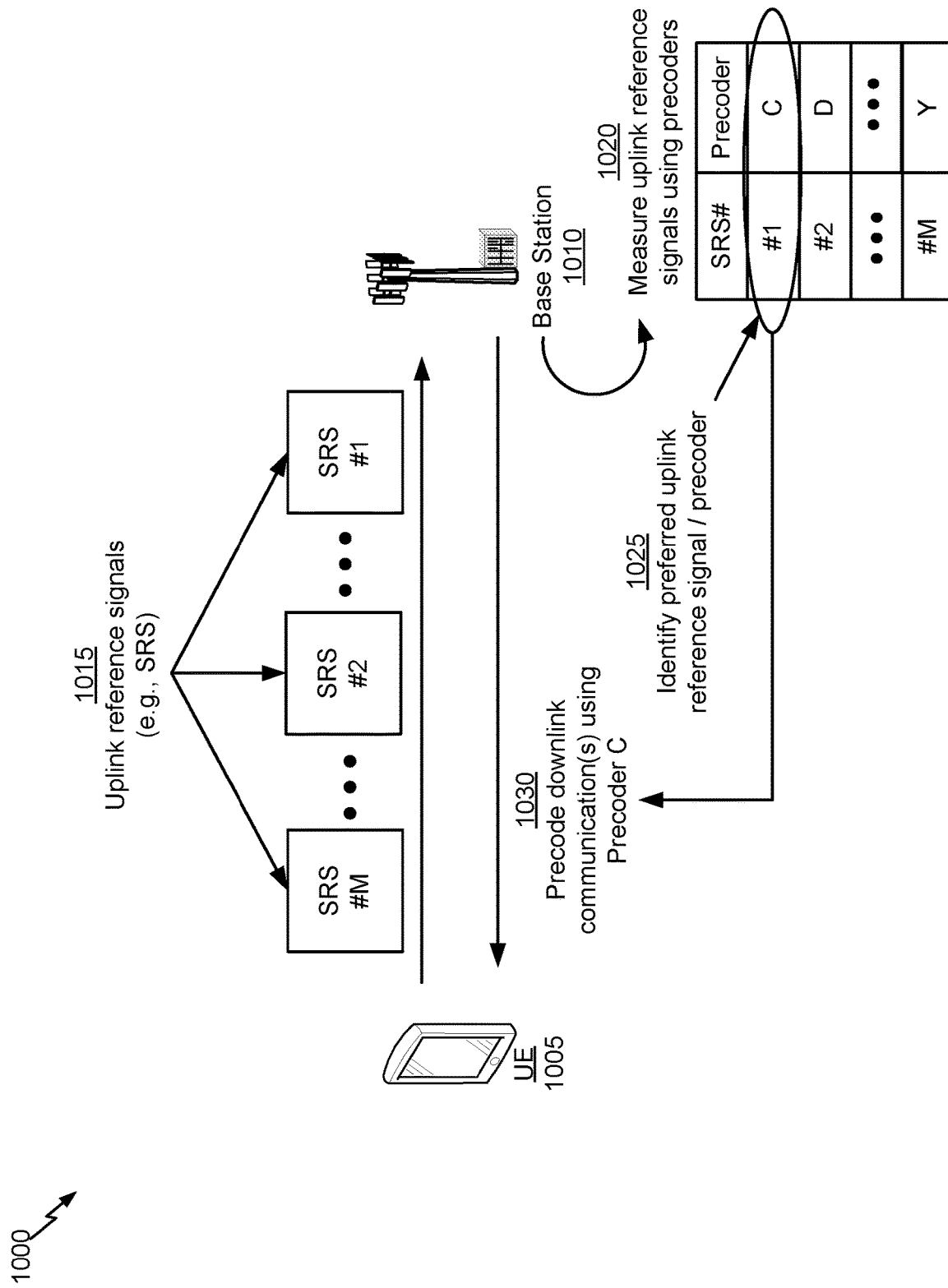
FIG. 10 is a diagram illustrating an example of downlink precoder determination using uplink reference signals, in accordance with various aspects of the present disclosure.

FIG. 10 is a diagram illustrating an example 1000 of downlink precoder determination using uplink reference signals, in accordance with various aspects of the present disclosure.

As shown in FIG. 10, a UE 1005 may communicate with a base station 1010. The UE 1005 may correspond to, for example, the UE 120 of FIG. 1, the UE 905 of FIG. 9, and/or the like. The base station 1010 may correspond to, for example, the base station 110 of FIG. 1, the base station 910 of FIG. 9, and/or the like.

As shown by reference number 1015, the UE 1005 may transmit a plurality of uplink reference signals to the base station 1010. As shown, in some aspects, the plurality of uplink reference signals are a plurality of sounding reference signals (SRS). In some aspects, the UE 1005 may transmit the uplink reference signals according to a schedule (e.g., a periodic schedule or an aperiodic schedule), which may be negotiated with and/or indicated by the base station 1010 (e.g., in radio resource control (RRC) connection configuration information and/or the like).

As shown by reference number 1020, the base station 1010 may measure the plurality of uplink reference signals using different precoders. For example, the base station 1010 may tune to an uplink reference signal, and may measure the uplink reference signal. In some aspects, the base station 1010 may cycle through a plurality of precoders to receive the uplink reference signals. As an example, the base station 1010 may use a first precoder shown as Precoder C to measure a first uplink reference signal shown as SRS #1, may use a second precoder shown as Precoder D to measure a second uplink reference signal shown as SRS #2, and/or the like.

As shown by reference number 1025, the base station 1010 may use the measured plurality of uplink reference signals to identify a preferred uplink reference signal (e.g., a preferred SRS), which may be associated with a precoder. For example, a preferred uplink reference signal may be associated with a better channel quality than one or more other measured uplink reference signals. In some aspects, the preferred uplink reference signal may be associated with the best channel quality as compared to the other measured uplink references signals (e.g., within a time period). As shown, the uplink reference signal shown as SRS #1 may be associated with a better channel quality as compared to the SRS #2, SRS #M, and/or the like.

In some aspects, the base station 1010 may further identify the preferred uplink reference signal and/or the precoder based at least in part on one or more scheduling decisions. The base station 1010 may make a scheduling decision based at least in part on, for example, one or more measurement reports, associated with downlink reference signals, received from the UE 1005 (e.g., one or more CSI-RS measurement reports), an indication of an uplink and/or a downlink channel quality, and/or the like.

As further shown, the preferred uplink reference signal may correspond to a precoder, and the base station 1010 may identify the precoder based at least in part on a stored correspondence between the preferred uplink reference signal and the precoder. For example, and as shown, the base station 1010 may store information that indicates a correspondence between different precoders used to measure different uplink reference signals. In example 1000, the base station 1010 identifies SRS #1 as having the best channel quality, and determines that Precoder C was used to measure SRS #1.

As shown by reference number 1030, the base station 1010 may precode one or more downlink communications using the identified precoder, shown as Precoder C, and may transmit the one or more downlink communications to the UE 1005.

In some aspects, the base station 1010 may apply a correction factor to precode the downlink communication(s) using the precoder. For example, an uplink channel and a downlink channel may lack true reciprocity, and the base station 1010 may account for this by applying a correction factor. In some aspects, the correction factor may include a modification of one or more weights applied to values associated with one or more antennas, signals, transmission powers, transmission chains, reception chains, and/or the like.

By using uplink reference signals to determine a downlink precoder, the UE 1005 and the base station 1010 may conserve network resources by skipping or preventing transmission of one or more downlink references signals, such as CSI-RS communications, that would otherwise be used by the UE 1005 and/or the base station 1010 to identify the precoder to be used for the one or more downlink communications.

In some aspects, the base station 1010 may determine a quantity or a directionality of downlink reference signals (e.g., CSI-RS) to be transmitted by the base station 1010. For example, the base station 1010 may determine a quantity that is less than a quantity of downlink reference signals that the base station 1010 would otherwise transmit if the downlink reference signals were used to determine a downlink precoder. Additionally, or alternatively, the base station 1010 may determine fewer directions for transmission of downlink reference signals as compared to a quantity of directions in which the base station 1010 would otherwise transmit downlink reference signals if the downlink reference signals were used to determine a downlink precoder.

In some aspects, the base station 1010 may determine the quantity and/or directionality of the downlink reference signals based at least in part on a determination of a correspondence between one or more downlink reference signals and one or more uplink reference signals with regard to channel quality, as described above in connection with FIG. 9. In this way, the UE 1005 and the base station 1010 can conserve downlink resources by adjusting a quantity of downlink reference signals to be transmitted by the base station 1010 when a downlink precoder can be identified using uplink reference signals.

As indicated above, FIG. 10 is provided as an example. Other examples are possible and may differ from what was described with respect to FIG. 10.

Figure 11:
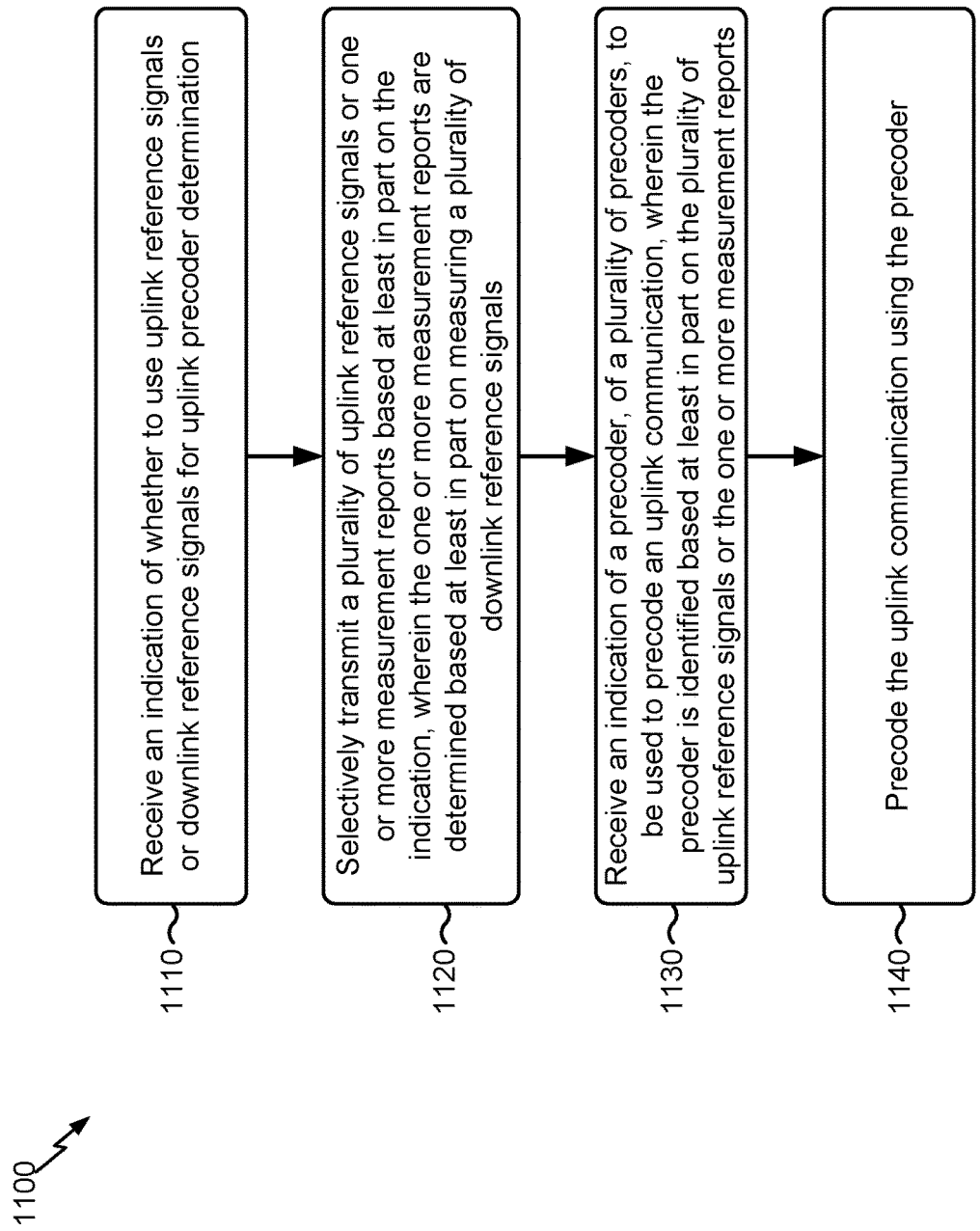
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., the UE 120 of FIG. 1, the UE 905 of FIG. 9, the UE 1005 of FIG. 10, and/or the like) performs uplink precoder determination using downlink reference signals.

As shown in FIG. 11, in some aspects, process 1100 may include receiving an indication of whether to use uplink reference signals or downlink reference signals for uplink precoder determination (block 1110). For example, the UE may receive an indication of whether to use uplink reference signals or downlink reference signals for uplink precoder determination, as described above in connection with FIGS. 9A-9B. In some aspects, the plurality of uplink reference signals are a plurality of sounding reference signals. In some aspects, the plurality of downlink reference signals are a plurality of channel state information reference signals (CSI-RS). In some aspects, the indication may indicate a degree of reciprocity between an uplink beam, via which the uplink communication is to be transmitted, and a corresponding downlink beam that forms a reciprocal beam pair with the uplink beam.

As shown in FIG. 11, in some aspects, process 1100 may include selectively transmitting a plurality of uplink reference signals or one or more measurement reports based at least in part on the indication, wherein the one or more measurement reports are determined based at least in part on measuring a plurality of downlink reference signals (block 1120). For example, the UE may determine whether to transmit uplink reference signals or measurement reports associated with downlink reference signals based at least in part on the indication, as described above in connection with FIGS. 9A-9B. When the indication indicates that the UE is to transmit uplink reference signals, the UE may transmit the uplink reference signals to the base station. In some aspects, the plurality of uplink reference signals include a quantity of uplink reference signals indicated to the UE by the base station. In some aspects, the plurality of uplink reference signals are transmitted using one or more beams indicated to the UE by the base station.

When the indication indicates that the UE is to transmit measurement reports associated with downlink reference signals, the UE may receive and measure a plurality of downlink reference signals transmitted by a base station, and may transmit one or more measurement reports to the base station based at least in part on receiving and measuring the plurality of downlink reference signals.

As further shown in FIG. 11, in some aspects, process 1100 may include receiving an indication of a precoder, of a plurality of precoders, to be used to precode an uplink communication, wherein the precoder is identified based at least in part on the plurality of uplink reference signals or the one or more measurement reports (block 1130). For example, the UE may receive, from the base station, an indication of a precoder to be used to precode an uplink communication. The precoder may be identified based at least in part on the one or more measurement reports or the plurality of uplink reference signals.

In some aspects, the precoder corresponds to a measured downlink reference signal associated with a better channel quality than one or more other measured downlink references signals included in the plurality of downlink reference signals. In some aspects, the precoder is further identified based at least in part on one or more scheduling decisions.

In some aspects, the indication of the precoder is received in downlink control information (DCI). In some aspects, the DCI identifies at least one of: the precoder to be used to precode the uplink communication, a downlink reference signal corresponding to the precoder, a ranking of the precoder and at least one other precoder, or a ranking of the downlink reference signal and at least one other downlink reference signal. In some aspects, the DCI indicates a first precoder to be used for a first uplink channel and a second precoder to be used for a second uplink channel. In some aspects, the first uplink channel is a physical uplink control channel and the second uplink channel is a physical uplink shared channel.

In some aspects, the UE is configured to use another precoder to precode the uplink communication based at least in part on a determination that the precoder cannot be used. Additionally, or alternatively, the UE may be configured to apply a correction factor to precode the uplink communication using the precoder. Additionally, or alternatively, the UE receive (e.g. from the base station) an indication relating to a quantity or a directionality of uplink reference signals to be transmitted based at least in part on a determination of a correspondence between one or more downlink reference signals and one or more uplink reference signals with regard to channel quality.

As further shown in FIG. 11, in some aspects, process 1100 may include precoding the uplink communication using the precoder (block 1140). For example, the UE may precode the uplink communication using the precoder, and may transmit the precoded uplink communication to the base station. Additional details regarding example process 1100 are described above in connection with FIGS. 9A and 9B.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
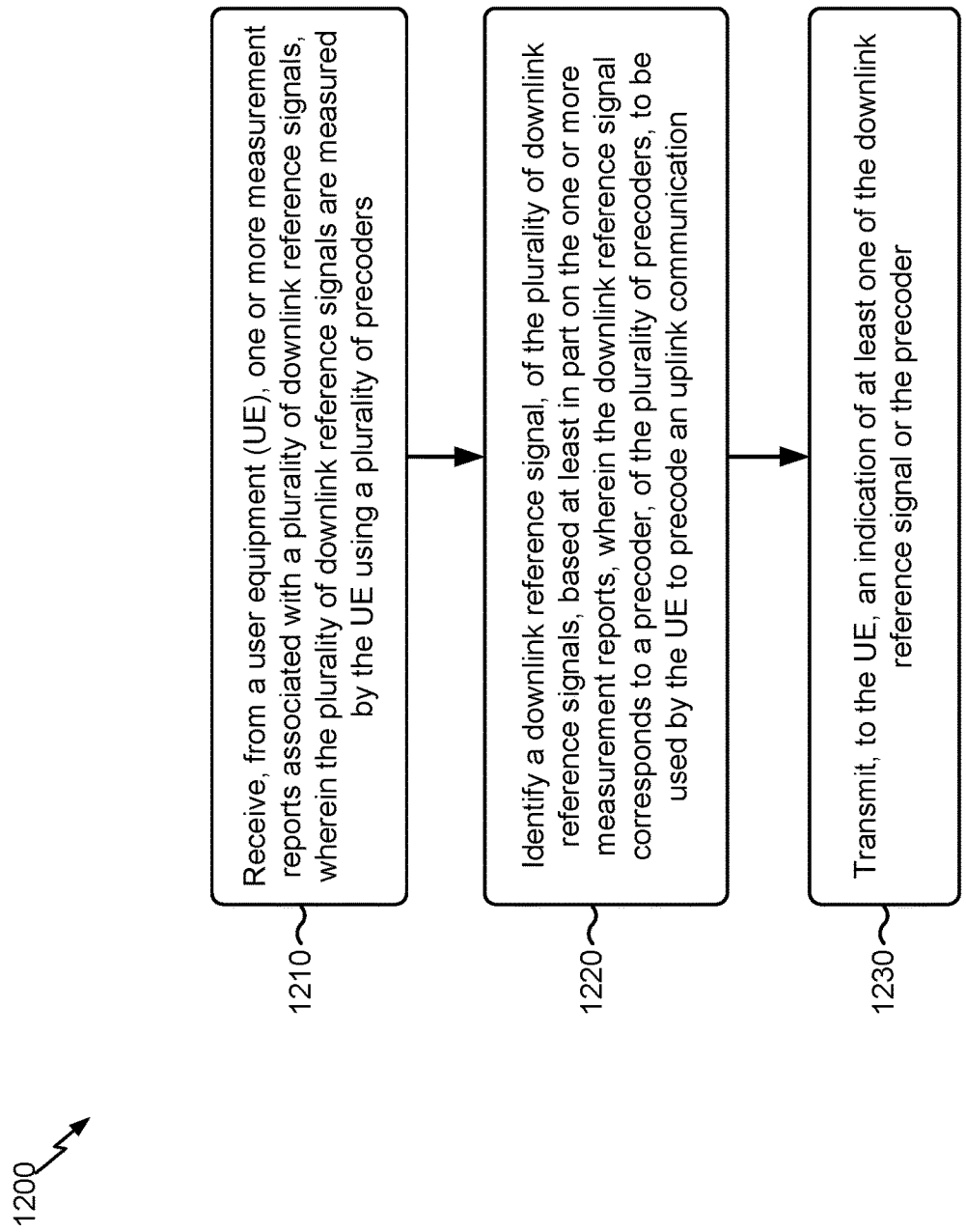
FIG. 12 is a diagram illustrating an example process performed, for example, by a base station, in accordance with various aspects of the present disclosure.

FIG. 12 is a diagram illustrating an example process 1200 performed, for example, by a base station, in accordance with various aspects of the present disclosure. Example process 1200 is an example where a base station (e.g., the base station 110 of FIG. 1, the base station 910 of FIG. 9, the base station 1010 of FIG. 10, and/or the like) performs uplink precoder determination using downlink reference signals.

As shown in FIG. 12, in some aspects, process 1200 may include receiving, from a UE, one or more measurement reports associated with a plurality of downlink reference signals, wherein the plurality of downlink reference signals are measured by the UE using a plurality of precoders (block 1210). For example, the base station may receive, from a UE, one or more measurement reports associated with a plurality of downlink reference signals. The plurality of downlink reference signals may have been previously transmitted by the base station to the UE, and the UE may have measured the plurality of downlink reference signals using a plurality of precoders. In some aspects, the plurality of downlink reference signals are a plurality of channel state information reference signals (CSI-RS).

In some aspects, the one or more measurement reports are received based at least in part on an indication, transmitted to the UE, to use downlink reference signals for uplink precoder determination. In some aspects, the indication indicates a degree of reciprocity between an uplink beam, via which the uplink communication is to be transmitted, and a corresponding downlink beam that forms a reciprocal beam pair with the uplink beam. In some aspects, the base station may transmit an indication to use uplink reference signals instead of downlink reference signals for uplink precoder determination, as described above in connection with FIGS. 9A-9B. In this case, the UE may stop transmitting the measurements reports associated with the downlink reference signals and/or may start transmitting uplink reference signals, as described elsewhere herein. Additionally, or alternatively, the base station may use uplink reference signals, received from the UE, for an uplink precoder determination based at least in part on transmitting the indication to use uplink reference signals for the uplink precoder determination.

As further shown in FIG. 12, in some aspects, process 1200 may include identifying a downlink reference signal, of the plurality of downlink reference signals, based at least in part on the one or more measurement reports, wherein the downlink reference signal corresponds to a precoder, of the plurality of precoders, to be used by the UE to precode an uplink communication (block 1220). For example, the base station may identify a downlink reference signal (e.g., a preferred downlink reference signal associated with a preferred communication channel) based at least in part on the one or more measurement reports. The downlink reference signal may correspond to a precoder, of the plurality of precoders, to be used by the UE to precode an uplink communication.

In some aspects, the downlink reference signal is associated with a better signal quality than one or more other measured downlink references signals included in the plurality of downlink reference signals. Additionally, or alternatively, the precoder may be identified based at least in part on one or more scheduling decisions made by the base station.

As further shown in FIG. 12, in some aspects, process 1200 may include transmitting, to the UE, an indication of at least one of the downlink reference signal or the precoder (block 1230). For example, the base station may transmit, to the UE, an indication of at least one of the downlink reference signal or the precoder. In some aspects, the indication of at least one of the downlink reference signal or the precoder is transmitted in downlink control information (DCI). In some aspects, the DCI identifies at least one of: the precoder to be used to precode the uplink communication, the downlink reference signal corresponding to the precoder, a ranking of the precoder and at least one other precoder, or a ranking of the downlink reference signal and at least one other downlink reference signal. Additionally, or alternatively, the DCI may indicate a first precoder to be used for a first uplink channel and a second precoder to be used for a second uplink channel.

In some aspects, the base station transmits an indication of a quantity or a directionality of uplink reference signals to be transmitted by the UE based at least in part on a determination of a correspondence between one or more downlink reference signals and one or more uplink reference signals with regard to channel quality. Additional details regarding example process 1200 are described above in connection with FIGS. 9A and 9B.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
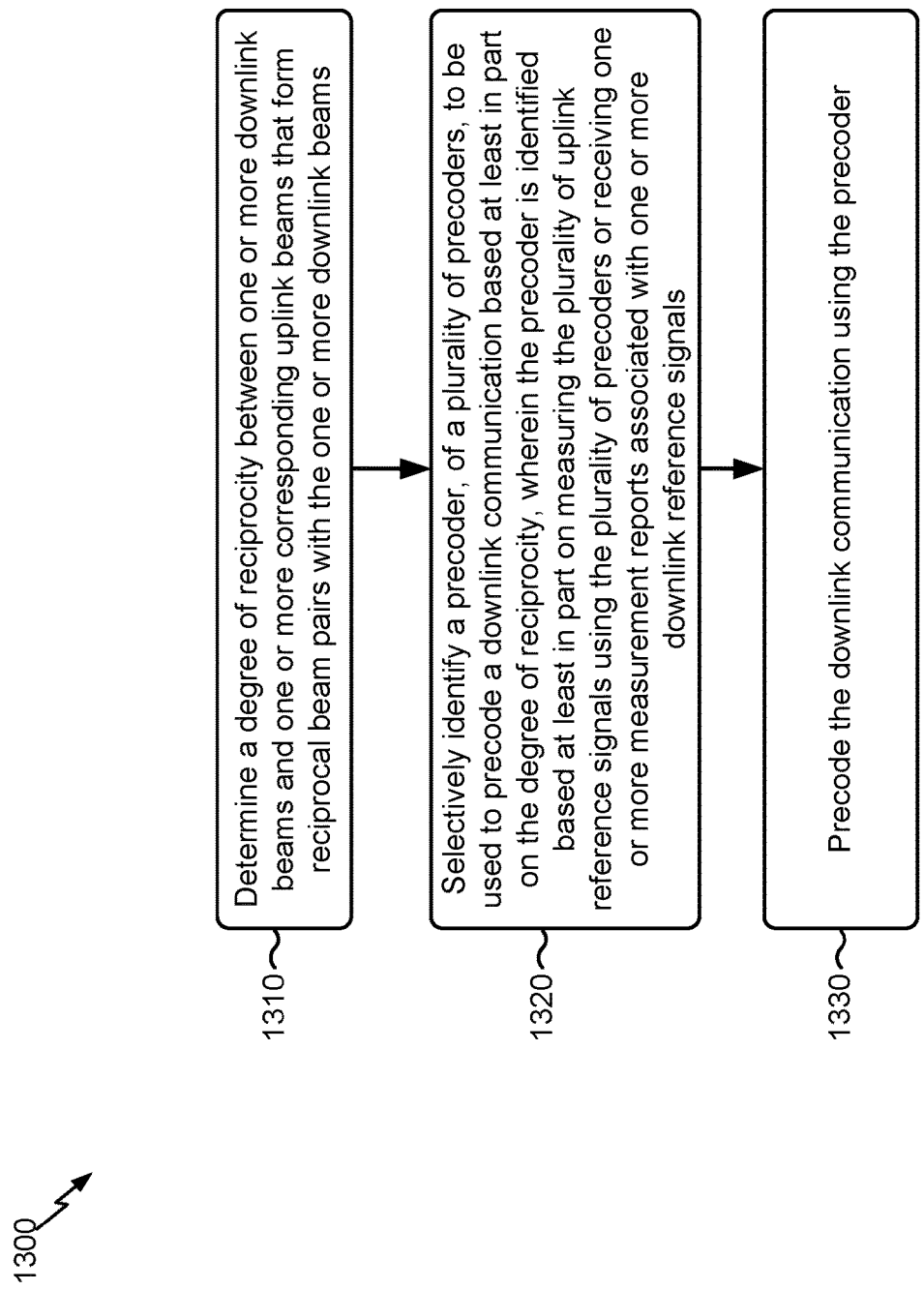
FIG. 13 is a diagram illustrating another example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where a base station (e.g., the base station 110 of FIG. 1, the base station 910 of FIG. 9, the base station 1010 of FIG. 10, and/or the like) performs downlink precoder determination using uplink reference signals.

As shown in FIG. 13, in some aspects, process 1300 may include determining a degree of reciprocity between one or more downlink beams and one or more corresponding uplink beams that form reciprocal beam pairs with the one or more downlink beams (block 1310). For example, the base station may determine a degree of reciprocity between downlink beams and corresponding uplink beams, as described elsewhere herein.

As further shown in FIG. 13, in some aspects, process 1300 may include selectively identifying a precoder, of a plurality of precoders, to be used to precode a downlink communication based at least in part on the degree of reciprocity, wherein the precoder is identified based at least in part on measuring the plurality of uplink reference signals using the plurality of precoders or receiving one or more measurement reports associated with one or more downlink reference signals (block 1320). For example, the base station may identify a precoder to be used to precode a downlink communication. In some aspects, such as when there is a high degree of reciprocity, the precoder is identified based at least in part on measuring the plurality of uplink reference signals using a plurality of precoders that includes the precoder. In some aspects, the plurality of uplink reference signals are a plurality of sounding reference signals (SRS) transmitted by the UE.

In some aspects, such as when there is a low degree of reciprocity, the precoder is identified based at least in part on receiving one or more measurement reports generated by the UE based at least in part on reception of one or more downlink reference signals transmitted by the base station to the UE.

In some aspects, the precoder is identified based at least in part on measuring the plurality of uplink reference signals when the degree of reciprocity is greater than a threshold. In some aspects, the precoder is identified based at least in part on receiving the plurality of measurement reports associated with the one or more downlink reference signals when the degree of reciprocity is less than a threshold.

As further shown in FIG. 13, in some aspects, process 1300 may include precoding, by the base station, the downlink communication using the precoder (block 1330). For example, the base station may precode the downlink communication using the precoder, and may transmit the precoded downlink communication to the UE.

In some aspects, the base station determines a quantity or a directionality of downlink reference signals to be transmitted based at least in part on a determination of a correspondence between one or more downlink reference signals and one or more uplink reference signals with regard to channel quality. In some aspects, the base station transmits downlink reference signals to the UE based at least in part on the determination. Additional details regarding example process 1300 are described above in connection with FIG. 10.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:
1. A method of wireless communication performed by a user equipment (UE), comprising:
receiving a plurality of downlink reference signals;
determining a precoder, of a plurality of precoders, to be used to precode an uplink communication based at least in part on one or more channel state information reference signals (CSI-RS) of the plurality of downlink reference signals;

determining that the precoder cannot be used; and precoding the uplink communication using another precoder based at least in part on determining that the precoder cannot be used.

2. The method of claim 1, wherein the precoder is further determined based at least in part on one or more scheduling decisions.

3. The method of claim 1, wherein precoding the uplink communication comprises:

applying a correction factor to precode the uplink communication.

4. The method of claim 3, wherein the correction factor includes an adjustment to account for an imbalance between a transmission chain of the UE and a reception chain of the UE.

5. The method of claim 1, wherein the one or more CSI-RS include a plurality of CSI-RS.

6. The method of claim 1, wherein the precoder is for a Physical Uplink Shared Channel (PUSCH).

7. The method of claim 1, further comprising:

receiving an indication to use the plurality of downlink reference signals for uplink precoder determination, wherein the precoder is an uplink precoder.

8. A user equipment (UE) for wireless communication, comprising:

a memory; and one or more processors, coupled to the memory, configured to:

receive a plurality of downlink reference signals;

determine a precoder, of a plurality of precoders, to be used to precode an uplink communication based at least in part on one or more channel state information reference signals (CSI-RS) of the plurality of downlink reference signals;

determine that the precoder cannot be used; and precode the uplink communication using another precoder based at least in part on determining that the precoder cannot be used.

9. The UE of claim 8, wherein the precoder is further determined based at least in part on one or more scheduling decisions.

10. The UE of claim 8, wherein the one or more CSI-RS include a plurality of CSI-RS.

11. The UE of claim 8, wherein the precoder is for a Physical Uplink Shared Channel (PUSCH).

12. The UE of claim 8, wherein, when precoding the uplink communication, the one or more processors are further configured to:

apply a correction factor to precode the uplink communication.

13. The UE of claim 12, wherein the correction factor includes an adjustment to account for an imbalance between a transmission chain of the UE and a reception chain of the UE.

14. The UE of claim 12, wherein the correction factor includes a modification of one or more weights applied to values associated with one or more antennas, signals, or transmission powers.

15. The UE of claim 8, wherein the one or more processors are further configured to:

receive an indication to use the plurality of downlink reference signals for uplink precoder determination, wherein the precoder is an uplink precoder.

16. The UE of claim 15, wherein the indication indicates a degree of reciprocity between one or more uplink beams and a corresponding one or more downlink beams.

17. The UE of claim 8, wherein the precoder is an uplink precoder, and wherein the one or more processors are further configured to:

determine a downlink precoder based at least in part on uplink reference signals.

18. The UE of claim 8, wherein, when determining the precoder, the one or more processors are configured to:

use the one or more CSI-RS to estimate uplink channel characteristics; and determine the precoder based at least in part on the uplink channel characteristics.

19. The UE of claim 8, wherein the one or more processors are further configured to:

use uplink reference signals to estimate downlink channel characteristics; and determine a different precoder, to be used by a base station, based at least in part on the downlink channel characteristics.

20. A non-transitory computer-readable medium storing a set of instructions for wireless communication, the set of instructions comprising:

one or more instructions that, when executed by one or more processors of a user equipment (UE), cause the UE to:

receive a plurality of downlink reference signals;

determine a precoder, of a plurality of precoders, to be used to precode an uplink communication based at least in part on one or more channel state information reference signals (CSI-RS) of the plurality of downlink reference signals;

determine that the precoder cannot be used; and precode the uplink communication using another precoder based at least in part on determining that the precoder cannot be used.

21. The non-transitory computer-readable medium of claim 20, wherein the one or more CSI-RS include a plurality of CSI-RS.

22. The non-transitory computer-readable medium of claim 20, wherein the precoder is for a Physical Uplink Shared Channel (PUSCH).

23. The non-transitory computer-readable medium of claim 20, wherein the one or more instructions that cause the UE to precode uplink communication cause the UE to:

apply a correction factor to precode the uplink communication.

24. The non-transitory computer-readable medium of claim 23, wherein the correction factor includes an adjustment to account for an imbalance between a transmission chain of the UE and a reception chain of the UE.

25. The non-transitory computer-readable medium of claim 23, wherein the correction factor includes a modification of one or more weights applied to values associated with one or more antennas, signals, or transmission powers.

26. The non-transitory computer-readable medium of claim 20, wherein the one or more instructions further cause the UE to:

receive an indication to use the plurality of downlink reference signals for uplink precoder determination, wherein the precoder is an uplink precoder.

27. The non-transitory computer-readable medium of claim 26, wherein the indication indicates a degree of reciprocity between one or more uplink beams and a corresponding one or more downlink beams.

28. The non-transitory computer-readable medium of claim 20,
 wherein the precoder is an uplink precoder, and
 wherein the one or more instructions further cause the UE to:
  determine a downlink precoder based at least in part on uplink reference signals.

29. The non-transitory computer-readable medium of claim 20, wherein the one or more instructions further cause the UE to:
 use uplink reference signals to estimate downlink channel characteristics; and
 determine a different precoder, to be used by a base station, based at least in part on the downlink channel characteristics.

30. An apparatus comprising:
 means for receiving a plurality of downlink reference signals;
 means for determining a precoder, of a plurality of precoders, to be used to precode an uplink communication based at least in part on one or more channel state information reference signals (CSI-RS) of the plurality of downlink reference signals;
 means for determining that the precoder cannot be used; and
 means for precoding the uplink communication using another precoder based at least in part on determining that the precoder cannot be used.

* * * * *